Aug. 30, 1966     D. F. GERMAN     3,269,097
AIRLINE FILTER
Filed Jan. 27, 1964
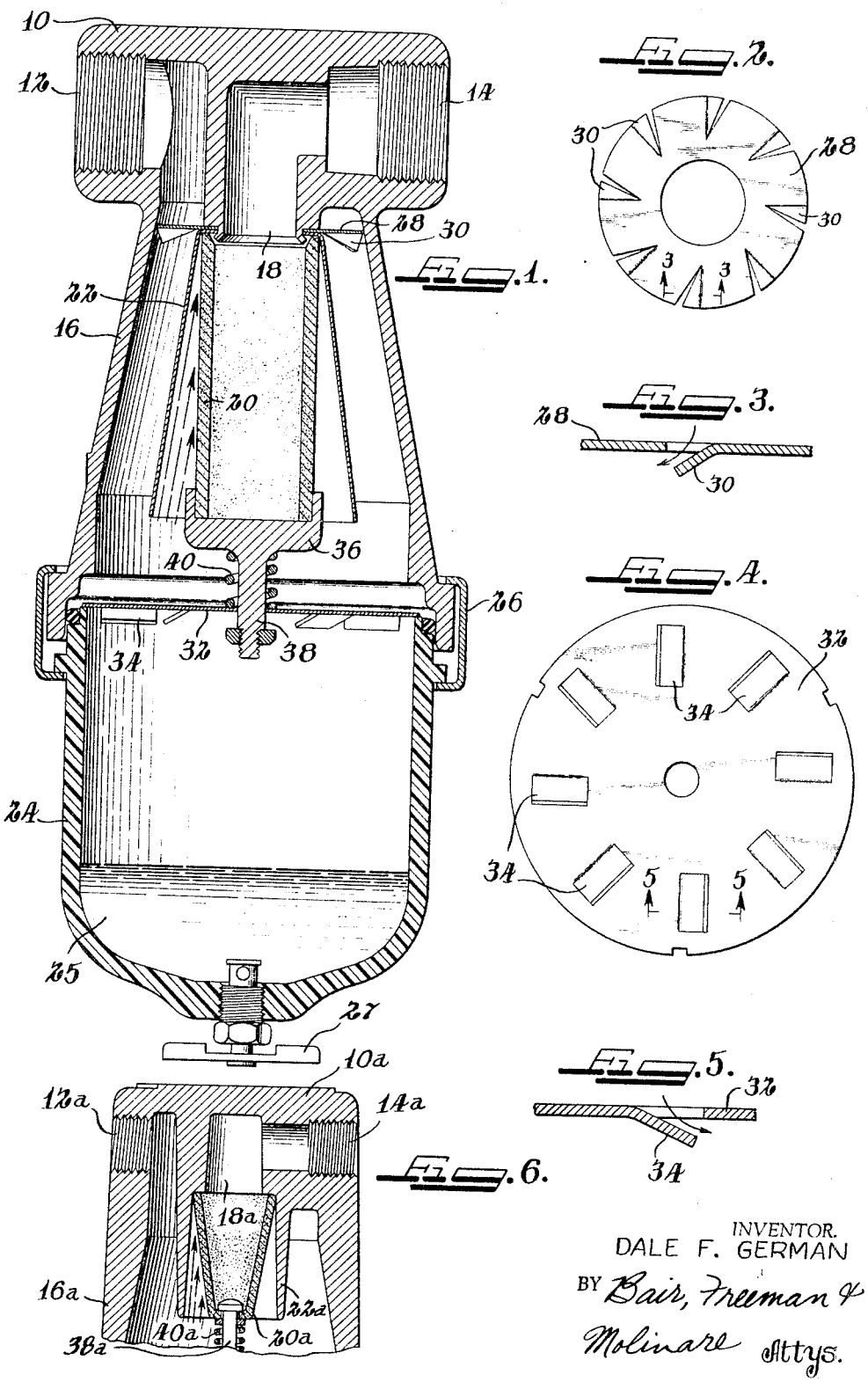
INVENTOR.
DALE F. GERMAN
BY Bair, Freeman &
Molinare Attys.

United States Patent Office 3,269,097
Patented August 30, 1966

3,269,097
AIRLINE FILTER
Dale F. German, Bryan, Ohio, assignor to The Aro Corporation, Bryan, Ohio, a corporation of Ohio
Filed Jan. 27, 1964, Ser. No. 340,418
2 Claims. (Cl. 55—337)

This invention relates to an air filter of comparatively simple construction having means to effectively remove entrained water from the air passing through the filter.

One object of the invention is to provide an air filter having an inlet and an outlet, a filter element being interposed between the inlet and the outlet, and a baffle being interposed in the air flow to cause the air to move downwardly and then return upwardly before entering the filter element thereby aiding gravity in separating entrained water from the air.

Another object is to provide a pair of baffle plates having swirl blades inclined in opposite directions for swirling the air to take advantage of centrifugal force in removing entrained water from the air and to reduce turbulence of the air in a water collecting bowl of the filter.

Still another object is to provide the filter with a tubular body which has a changing diameter throughout its height which is inclined downwardly and outwardly in the flow direction, to increase the flow area and reduce the circumferential velocity of the air at the wall before it reverses direction to enter the tubular baffle, surrounding the filter element.

A further object is to provide a diameter relationship between the tubular filter element and a tubular baffle surrounding the filter element which throughout their height have a converging relationship downwardly relative to each other in order to equally distribute air from the filter body over the surface of the filter element.

With these and other objects in view, my invention consists in the construction, arrangement and combination of the various parts of my airline filter, whereby the objects above contemplated are attained, as hereinafter more fully set forth, pointed out in my claims and illustrated in detail on the accompanying drawing, wherein:

FIG. 1 is a vertical sectional view through an airline filter embodying my invention;

FIG. 2 is a plan view of an upper baffle plate therein;

FIG. 3 is a sectional view on the line 3—3 of FIG. 2 to illustrate a swirl blade and the direction that it deflects air passing by it;

FIG. 4 is a plan view of a lower baffle plate;

FIG. 5 is a sectional view similar to FIG. 3 showing a swirl blade of the lower baffle plate and the direction that it deflects air passing by it, and FIG. 6 is a sectional view similar to the upper portion of FIG. 1 showing a modified form of my airline filter.

On the accompanying drawing I have used the reference numeral 10 to indicate a filter head. The head 10 is provided with an air inlet 12 and an air outlet 14. A tubular body 16 depends from the head 10 and within the tubular body adjacent the upper end thereof the outlet 14 has an air receiving end 18. A tubular filter element 20 depends from the air receiving end 18.

A tubular baffle 22 surrounds the filter element 20 and a water collecting bowl 24 is connected to the lower end of the body 16 by a connecting sleeve 26 of bayonet joint character or the like, a suitable O-ring being provided in the connection for sealing purposes.

Adjacent the top of the tubular body 16 I provide an upper baffle plate 28 having swirl blades 30 and at the upper end of the bowl 24 I provide a lower baffle plate 32 having swirl blades 34 as shown in FIGS. 2 and 4, respectively. The sectional views, FIGS. 3 and 5, include arrows to indicate the direction in which the blades 30 and 34 swirl the air passing by them. A filter element closure 36 is provided for the lower end of the tubular filter element 20 and has a shank 38 extending slidably through a central perforation of the baffle plate 32, a spring 40 being interposed between this plate and the closure 36 for biasing the filter element 20 upwardly into seated contact at its upper end with the air receiving end 18 of the outlet 14.

The tubular baffle 22 confines the incoming air from the inlet 12 so that it must pass downwardly and around the lower end of the baffle before returning upwardly to pass through the filter element 20. Accordingly, gravity is assisted in removing entrained water and other liquids which may contain contaminants and solids from the air passing through the filter, particularly where the direction of the air is reversed after passing down the outside of the baffle 22 and before passing upwardly inside of it. Such removed water, air compressor oil and the like gravitates into the bowl 24.

As a further aid to the separation of water from the air, the tubular body 16 has a diameter throughout its height which diverges downwardly thereby progressively increasing the diameter of the body within which the air swirled by the blades 30 of the baffle plate 28 passes. This decreases the circumferential velocity of the air stream and reduces reentrainment and atomization of water, oil and other contaminants which are removed at the upper end of the body. The high-drag effect of the initial swirling air stream on the wall of the lower portion of the tubular body 16 is also reduced thus minimizing the re-entrainment of water and other liquids that have been removed from the air stream and deposited on the upper portion of the body wall and which have run down the sides thereof. The swirl blades 34 of the baffle plate 32 are inclined in the opposite direction with respect to the swirl blades 30 as evident by comparing FIG. 5 with FIG. 3 so that first the air is swirled by the baffle plate 28 clockwise so that the desired centrifugal force effect is had. It is desirable, however, to reduce the turbulence of the air in the bowl 24 above the separated water 25 therein and the blades 34 inclined in the opposite direction perform this function. A drain valve 27 is provided to dispose of the water when desired.

As for the tubular baffle 22, it is open at its lower end and closed with respect to the filter element 20 at its upper end, and is cone-shaped so as to provide a progressively smaller circular area for the air as it passes upwardly from the lower end of the baffle 22 as indicated by arrows in FIG. 1. This arrangement substantially equally distributes the air over the surface of the filter element. Thus a diameter relationship as between the baffle 22 and the filter element 20 is had which diverges downwardly and may be accomplished as illustrated in FIG. 1 or by the alternative arrangement shown in FIG. 6 where the filter element instead of the baffle is cone-shaped. In both cases the diameter relationship between the two diverges downwardly to secure the desired results. In FIG. 6 comparable parts have the same reference characters with the addition of a.

From the foregoing specification it will be obvious that I have provided an airline filter which accomplishes the objects contemplated. Some changes may be made in the construction and arrangement of the parts thereof without departing from the real spirit and purpose of my invention. It is, therefore, my intention to cover by my claims any modified forms of structure or use of mechanical equivalents which may reasonably be included within their scope.

I claim as my invention:
1. In an airline filter, a head, a frusto-conical body depending from said head, a water collecting bowl de- pending from the lower end of said frusto-conical body, said head having an inlet and an outlet in the upper end of said body, said outlet having an air receiving end which is substantially centrally located in the upper end of said body, a tubular filter element depending from said air receiving end of said outlet, a support therefor, spring means urging said support upwardly against said filter element and said filter element upwardly against said air receiving end of said outlet, a tubular baffle surrounding said filter element, said filter element and said tubular baffle having diameters throughout their height which have a downwardly diverging relationship to each other to equally distribute air from the lower end of said body over the surface of said filter element, baffle plates across the upper and lower ends of said frusto-conical body, one of said baffle plates having swirl blades which are inclined to swirl the air in one direction and the other of said baffle plates having swirl blades which are inclined to swirl the air in the opposite direction, the lower one of said baffle plates being supported by interposition between said body and said water collecting bowl, means for connecting the upper end of said water collecting bowl to the lower end of said frusto-conical body, said spring being interposed between said lower baffle plate and said support, the frusto-conical shape of said body reducing the velocity of the air before it reverses direction to flow from said body and enter said tubular baffle, and a drain valve at the lower end of said water collecting bowl.

2. An airline filter in accordance with claim 1 wherein said tubular baffle is frusto-conical shaped with its lower end spaced around the lower end of said filter element and its upper end closely surrounding the upper end of said filter element.

References Cited by the Examiner
UNITED STATES PATENTS

| | | | |
|---|---|---|---|
| 703,356 | 6/1903 | Edmond | 210—306 |
| 1,401,976 | 1/1922 | Giovannoni | 210—443 X |
| 1,948,543 | 2/1934 | Samiran | 210—115 |
| 2,010,456 | 8/1935 | Jones | 55—426 X |
| 2,311,697 | 2/1943 | Samiran | 210—115 |
| 2,377,549 | 6/1945 | Gustafsson et al. | 55—318 |
| 2,490,502 | 12/1949 | Audibert | 55—391 X |
| 2,563,786 | 8/1951 | James | 210—444 X |
| 2,692,655 | 10/1954 | Peeps | 55—466 X |
| 2,720,278 | 10/1955 | Wiley | 210—306 X |
| 2,825,425 | 3/1958 | Jacovelli et al. | 55—432 |
| 2,894,600 | 7/1959 | Veres | 55—426 X |
| 2,942,691 | 6/1960 | Dillon | 55—391 X |
| 2,943,698 | 7/1960 | Bishop | 55—449 X |
| 3,093,467 | 6/1963 | McLaughlin | 55—218 |
| 3,130,741 | 4/1964 | Vetere | 137—204 X |

FOREIGN PATENTS

| | | |
|---|---|---|
| 970,400 | 6/1950 | France. |
| 849,950 | 9/1952 | Germany. |
| 400,080 | 10/1933 | Great Britain. |

HARRY B. THORNTON, *Primary Examiner.*

D. E. TALBERT, *Assistant Examiner.*